Figure 1:
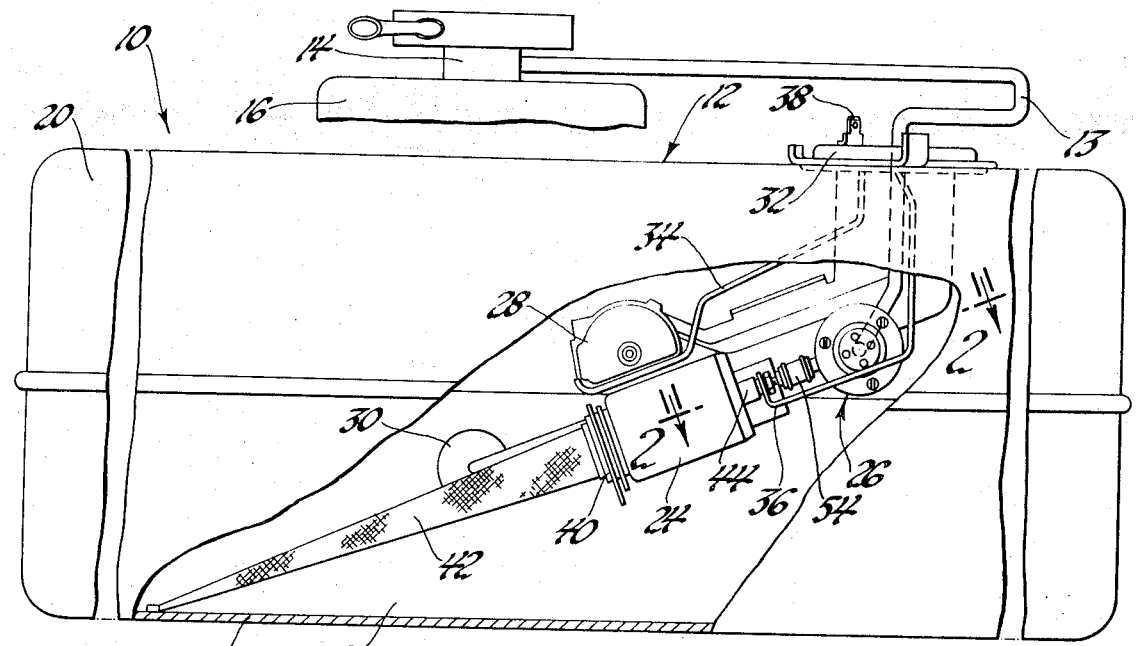

United States Patent [19]
Schimmelpfenig

[11] 3,763,840
[45] Oct. 9, 1973

[54] FUEL LINE SHUT OFF VALVE FOR PRESSURIZED FUEL SYSTEMS

[75] Inventor: Frederick J. Schimmelpfenig, Davison, Mich.

[73] Assignee: General Motors Corporation, Detroit, Mich.

[22] Filed: June 22, 1972

[21] Appl. No.: 265,292

[52] U.S. Cl. ................................................ 123/136
[51] Int. Cl. ...................... F02m 59/00, F02b 33/00
[58] Field of Search ..................................... 123/136

[56] References Cited
UNITED STATES PATENTS 3,357,687 12/1967 Vanderpoel ........................ 123/136
3,614,960 10/1971 Pfrengle .............................. 123/136
3,628,024 12/1971 Ciemochowski ................ 123/119 R Primary Examiner—Laurence M. Goodridge
Assistant Examiner—Cort Flint
Attorney—J. L. Carpenter et al.

[57] ABSTRACT

A fuel line shut off valve for a pressurized fuel system differentiates between fuel pump pressure, fuel tank pressure, and fuel line pressure to prevent fuel flow when the pump is not operating, maintain fuel pressure in the fuel line to ensure a fuel supply upon pump startup, and permit fuel bleed from the fuel line under over-pressure conditions.

3 Claims, 2 Drawing Figures

PATENTED OCT 9 1973  3,763,840

FUEL LINE SHUT OFF VALVE FOR PRESSURIZED FUEL SYSTEMS

The present invention relates to fuel systems and, in particuar, to a fuel line shut off valve for a pressurized fuel system.

Pressurized fuel systems for supplying fuel to an internal combustion engine comprise a sealed fuel tank having a fuel pump disposed therein which delivers fuel through a supply line to the engine. In such a system, the tank pressure can build up when the engine is shut off and the pump is not operating. The accompanying increase in supply line pressure may, under certain conditions, force fuel through the carburetor directly into the engine cylinders, a condition which can cause hard starting of the engine.

A pressurized fuel system, according to the present invention, incorporates a fuel line shut off valve which prevents a pressure buildup in the gas tank from forcing fuel through the fuel supply line into the carburetor after engine shutdown while controlling fuel line pressure to ensure available fuel upon vehicle startup.

These features are achieved by a diaphragm controlled shut off valve in the tank which is serially connected in the supply line between the pump and the carburetor. The diaphragm carries a valve member operative to open and close a passage to the valve outlet. One side of the diaphragm is exposed to tank pressure and together with a compression spring biases the valve member to a closed position. The outer portion of the other side of the diaphragm is exposed to fuel pump pressure and tank pressure while a center portion is exposed to supply line pressure. When the pump is not operating, the tank pressure and the supply line pressure are essentially balanced and the valve is biased to the closed position by the force of the spring. Thus, even upon an increase in tank pressure inasmuch as the latter acts over a larger area in biasing the valve member to the closed position, fuel flow through the supply line to the engine will be prevented. This closing action will also maintain fuel in the supply line for ready availability upon engine startup. However, if the fuel in the supply line vaporizes, the resulting increase in pressure will act on the valve member to open the valve against the biasing of the spring to permit fuel bleed from supply line and prevent over pressure conditions therein. Upon engine startup, the fuel pump pressure is sufficient to overcome the closing bias to open the valve and permit free fuel flow to the engine.

Figure 2:
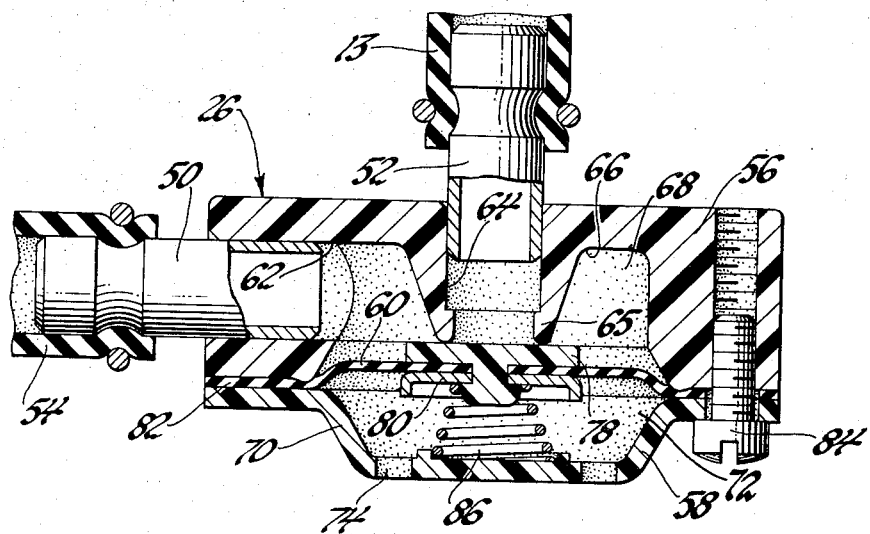

The above and other features of the present invention will be apparent to one skilled in the art upon reading the following detailed description, reference being made to the accompanying drawings illustrating a preferred embodiment of the present invention in which:

FIG. 1 is a side elevational view with portions broken away of a pressurized fuel system incorporating a fuel line shut off valve made in accordance with the present invention, and FIG. 2 is an enlarged cross-sectional view taken along line 2—2 of FIG. 1 showing details of construction of the fuel line shut off valve.

Referring to FIG. 1, there is shown a pressurized fuel system 10 for delivering fuel from a sealed fuel tank 12 through a supply line 13 to a carburetor 14 of an internal combustion engine 16. The fuel tank 12 includes a base member 18 and a cover member 20, the interior surfaces of which define a fuel chamber 22 for holding fuel and vapor under pressure. A removable cap assembly, not shown, permits fuel delivery to the chamber 22 in a conventional manner.

The pressurized fuel system 10 further includes an electrically operated fuel pump 24 and a fuel line shut off valve 26, both of which are disposed in the chamber 22. A sender unit 28 controlled by a float 30 is mounted on the fuel pump 24. The sender unit 28 is electrically connected to a terminal cap assembly 32 by a lead 34. The fuel pump 24 is electrically connected to the cap assembly 32 by an electrical lead 36. The pump 24 and the sender unit 28 are both commonly electrically connected to a ground terminal 38. A connector assembly (not shown) is received over the cap assembly 32 to electrically connect the pump 24 to the vehicle ignition system and the sender unit 28 to a suitable fuel gage for indicating the fuel level in the chamber 22.

The fuel pump 24 is conventional in construction and supplies fuel under pressure to the engine in accordance with demand. The pump 24 has an inlet 40 surrounded by a fuel filter 42 and an outlet 44 serially fluidly communicating with the fuel line shut off valve 26. When the vehicle ignition system is energized, the pump 24 draws fuel from the chamber 22 through the filter 42 and the inlet 40 for delivery through the fuel line shut off valve 26 to the supply line 13.

When the engine is shut down and the pump 24 is not operating, fuel and vapor pressure can build up in the chamber 22. This tank pressure will be transmitted directly through the pump 24 and, in the absence of shut-off valve 26, directly through the supply line 13 to the carburetor 14. If the pressure in the supply line 13 becomes excessive, the fuel may leak past the carburetor needle valve into the carburetor, a condition that can cause hard starting of the engine. Additionally, after engine shutdown, the latent engine heat may vaporize the fuel in the line 13 to further increase tank pressure. However, it is desirable to maintain fuel in the supply line 13 for availability upon engine startup.

The fuel line shutoff valve 26 controls fuel flow in the system 10 and comprises a two-piece valve body having an inlet tube 50 and an outlet tube 52. The inlet tube 50 is fluidly connected to the outlet 44 of the fuel pump 24 by a conduit 54. The outlet tube 52 is fluidly connected to the supply line 13.

The body of the valve 26 includes a base member 56, a cover member 58, and a diaphragm 60. The base member 56 is formed of a plastic material and includes a radial inlet port 62 which receives the inlet tube 50 and a central axial outlet port 64 which receives the outlet tube 52. The outlet port 64 includes a projecting annular rim defining a valve seat 65, and annular channel 66 formed between the ports 62 and 64 that defines with the top side of the diaphragm 60 a pressure chamber 68. The cover member 58 is formed of a plastic material and includes a frusto-conical center section 70 defining a pressure chamber 72 with the bottom side of the diaphragm 60. Four circumferentially spaced circular vents 74 are formed in the section 70 to fluidly expose the chamber 72 to pressure in the chamber 22.

A circular valve member 78 is centrally connected to the diaphragm 60 by a retaining cup 80. The valve member 78 moves in accordance with diaphragm movement with respect to the valve seat 65. When closed, the valve member 78 will prevent forward fuel flow through the supply line 13. When open, free forward fuel flow will be permitted through line 13. The periphery 82 of the diaphragm 60 is clamped between the base member 56 and the cover member 58 by means of three circumferentially disposed screws 84. A coiled spring 86 compressively retained between the cover member 58 and the cup 80 serves to bias the valve member 78 to the closed position.

When the fuel pump is not operating, the chamber 72 and the lower side of the diaphragm 60 will be exposed to tank pressure. The resulting force plus the force of the spring 86 will establish a valve closing force against the valve seat 65. The tank pressure will also be directly transmitted through the pump 24 to the chamber 68. This pressure will act upon an outer annular portion of the upper side of the diaphragm 60. Fuel pressure from the supply line 13 will act on the center portion of the valve member 78.

When the supply line pressure and the tank pressure are substantially equal, the valve closing force provided by the spring 86 will bias the valve member 78 to the closed position against the opposing forces. Upon a further increase in tank pressure, inasmuch as a larger area on the lower side of the diaphragm 60 is exposed to tank pressure, a further closing force will be provided. This will provide a positive valve closing when the pump is not operating, regardless of prevailing tank pressure. In the event fuel in the supply line vaporizes and increases fuel line pressure, the opening force on the valve member 78 will increase. Thus, when the pressure transmitted to the upper side of the diaphragm by the tank pressure in chamber 68 and the supply line pressure exceeds the closing force of the tank pressure in chamber 72 and the spring force 86, the valve member 78 will open to permit fuel bleed until equilibrium is established. When the fuel pump 24 is operating, the pressure will substantially increase in the pressure chamber 68 and will offset the closing biasing forces thereby shifting the valve member 78 downwardly to an open position and permitting fuel flow in accordance with demand through the supply line 13. This pressure differentiation thus provides the requisite of positive closing during shutdown, maintainenance of fuel in the supply line and bleeding of excessive fuel line pressure.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In a pressurized fuel system for an internal combustion engine having a fuel tank for holding fuel under tank pressure, pump means in the fuel tank for supplying fuel under a pumping pressure, and conduit means fluidly connecting the pump means and the engine for delivering fuel under a line pressure, a valve assembly comprising: valve housing means upstream of said pump means having inlet means fluidly connected to the pump means and outlet means fluidly connected to the conduit means; passage means in said valve housing means between said inlet means and said outlet means; valve means operatively disposed in said passage means and movable with respect to the latter between an open position and a closed position, said valve means having a first surface exposed to the tank pressure for biasing said valve means to said closed position, said valve means having a second surface including a first portion and a second portion, said first portion being exposed to the tank pressure and the pumping pressure for biasing said valve means to said open position, said second portion being exposed to said line pressure in said conduit means for biasing said valve means to said open position against the tank pressure on said first surface; and spring means biasing said valve means to said closed position, the biasing of said spring means being insufficient to resist the opening biasing provided by the pumping pressure acting on said first portion so as to ensure that said valve is in said open position when the pump means is operating.

2. A fuel line shut off valve for a pressurized fuel system having a fuel pump contained in a fuel tank for delivering fuel through a supply line to an internal combustion engine, said shut off valve comprising: a valve body having interior surfaces defining a cavity; diaphragm means retained in said cavity; a valve inlet communicating with said cavity on one side of said diaphragm means and fluidly connected to said fuel pump; a fuel outlet communicating with said one side of said diaphragm means and fluidly connected to said supply line; a valve member carried by said one side of said diaphragm means adapted to seat against said valve outlet and being exposed to the fuel pressure in said supply line, the outer periphery of said one side of said diaphragm means being exposed to the pressure developed by said fuel pump and the pressure in the fuel tank; vent means in said valve body fluidly communicating with the second chamber and exposing the other side of the diaphragm means to said pressure in the fuel tank for biasing said valve member to a closed position; and a spring compressively retained between said other side of said diaphragm means and said valve body for additionally biasing said valve member to a closed position, said spring providing sufficient force to seat said valve member when said fuel pump is not operating and said pressure in said supply line is below a predetermined level, said spring providing insufficient force to seat said valve member when the pump is operating or said pressure in said supply line is above said predetermined level.

3. In a pressurized fuel system for an internal combustion engine having a fuel tank holding fuel under pressure, a fuel pump contained in the fuel tank for delivering fuel under pressure through a supply line to the internal combustion engine, a fuel line shut off valve comprising: a valve body having interior surfaces defining an annular cavity; a circular flexible diaphragm retained in said cavity dividing the latter into a first chamber and a second chamber; a radial valve inlet communicating with said first chamber and fluidly connected with said fuel pump for exposing said first chamber to pressure in the fuel tank and pressure developed by the fuel pump; an axial fuel outlet communicating with said first chamber and fluidly connected to the supply line; an annular valve seat surrounding said fuel outlet; a valve member carried on the center portion of one side of said diaphragm adapted to seat against said valve seat and being exposed to the pressure in the supply line, the outer portion of the diaphragm being exposed to the pressure in said first chamber; a vent in said valve body fluidly communicating with the second chamber and exposing the other side of the diaphragm to the pressure in the fuel tank for biasing said valve member to a closed position; and a coiled compression spring in said second chamber operatively disposed between said diaphragm and said valve body for additionally biasing said valve member to a closed position, said spring providing sufficient biasing force to seat said valve member when said fuel pump is not operating and the pressure in the supply line is below a predetermined level, said spring having insufficient force to seat said valve member when the pump is operating or the pressure in the supply line is above said predetermined level.

* * * * *